United States Patent [19]

Meyer et al.

[11] Patent Number: 4,921,906
[45] Date of Patent: May 1, 1990

[54] PROCESS FOR THE PREPARATION OF A HOMOGENEOUS THERMOPLASTIC POLYMER

[75] Inventors: Peter J. N. Meyer, Munstergeleen; Reinard J. M. Steeman, Elsloo, both of Netherlands

[73] Assignee: Stamicarbon B.V., Geleen, Netherlands

[21] Appl. No.: 203,544

[22] Filed: May 27, 1988

Related U.S. Application Data

[63] Continuation of Ser. No. 858,748, May 2, 1986, abandoned.

[30] Foreign Application Priority Data

May 3, 1985 [NL] Netherlands ............................ 8501255

[51] Int. Cl.$^5$ ............................ C08F 2/02; C08F 2/06
[52] U.S. Cl. .................................... 525/53; 525/243; 525/285; 526/65; 526/88; 526/272; 526/918; 422/135
[58] Field of Search ............... 526/65, 88, 272, 918; 422/135; 525/53, 243, 285

[56] References Cited

U.S. PATENT DOCUMENTS

| | | | |
|---|---|---|---|
| 2,443,817 | 6/1948 | Draeger et al. ........................ | 526/65 |
| 3,354,136 | 11/1967 | Crawford ........................ | 526/88 X |
| 3,438,952 | 4/1969 | Christensen ........................ | 526/88 X |
| 3,458,484 | 7/1969 | Zimmerman et al. ........... | 526/272 X |
| 3,476,522 | 11/1969 | Stovall ........................ | 422/135 |
| 3,681,308 | 8/1972 | Irvin et al. ........................ | 526/65 X |
| 4,328,327 | 5/1982 | Tanaka et al. ........................ | 526/272 X |
| 4,442,273 | 4/1984 | Neiditch et al. ........................ | 526/88 |

FOREIGN PATENT DOCUMENTS

| | | | |
|---|---|---|---|
| 158393 | 11/1978 | Netherlands ........................ | 422/135 |
| 1151605 | 5/1969 | United Kingdom ........................ | 526/88 |
| 1404163 | 8/1975 | United Kingdom ........................ | 526/88 |

OTHER PUBLICATIONS

Partial Translation of Netherlands Pat. Appl'n No. 158393 (p. 1, lines 1–40).

Primary Examiner—Joseph L. Schofer
Assistant Examiner—F. M. Teskin
Attorney, Agent, or Firm—Cushman, Darby & Cushman

[57] ABSTRACT

The invention relates to a process for the preparation of a thermoplastic polymer on the basis of an alkenyl aromatic monomer, an unsaturated dicarboxylic anhydride, and, optionally, a rubber, characterized in that the monomers and/or solution thereof are/is reacted in at least two reaction zones that are in open connection with each other at the top and at the bottom, the reaction mixture being circulated through the reaction zones by means of a mixing device and/or a conveying device.

Using the process, a homogeneous product of constant composition is obtained.

15 Claims, 1 Drawing Sheet

PROCESS FOR THE PREPARATION OF A HOMOGENEOUS THERMOPLASTIC POLYMER

This is a continuation of application Ser. No. 858,748, filed May 2, 1986, which was abandoned upon the filing hereof.

BACKGROUND OF THE INVENTION

This invention relates to a process for the preparation of a thermoplastic polymer on the basis of an alkenyl aromatic monomer, an unsaturated dicarboxylic anhydride and, optionally, a rubber.

Copolymers from alkenyl aromatic monomers and unsaturated dicarboxylic anhydrides are known. An example of these copolymers are the copolymers from styrene and maleic anhydride (SMA). Preparation of these copolymers may take place both by batch processes and by continuous processes. The first commercial SMA copolymers were low-molecular products with molecular weights below 5000. These types were applied in, for instance, floor shampoos, floor waxes, emulsion paints and dispersing agents.

Besides these low-molecular products, the high-molecular SMA copolymers are of importance in, for instance, the automotive industry and in domestic articles.

Copolymers of styrene and/or α-methylstyrene and maleic anhydride are generally prepared by customary methods for, for instance, mass polymerization or solution polymerization. Thus, for instance, according to U.S. Pat. No. 2,971,939 copolymers of styrene and maleic anhydride can be obtained by reacting both monomers, styrene and maleic anhydride, in the presence of a peroxide. Better polymerization control is achieved by application of a solvent, for instance methyl ethyl ketone, acetone, xylene, dioxane, ethylbenzene, dimethylformamide or toluene.

A 50:50 (molar) copolymer can be obtained by discontinuous copolymerization of styrene and maleic anhydride, for instance by precipitation polymerization of styrene and maleic anhydride in aromatic solvents. Copolymers with a lower maleic anhydride content can be obtained if in continuous copolymerization a mixture of much styrene and little maleic anhydride is introduced into a polymerization vessel with vigorous stirring and at a high temperature, while an identical amount of the polymerization mixture is simultaneously removed from the vessel (A. W. Hanson and R. L. Zimmermann, Industrial Engineering Chemistry 49, p. 1803, 1957).

High-molecular SMA polymers can be processed by extrusion and injection moulding. The theoretical upper limit of the MA content is 50 mole % (alternating copolymers), but as high-molecular copolymers these products cannot be processed on account of the high softening point (220° C.). In addition, the brittleness and water sensitivity increase with the MA content.

Copolymers with a lower MA content and a higher molar mass, on the other hand, can be processed much easier. Of great importance in this context is the small dispersion in MA incorporation, which imposes high demands on the homogenity of the reaction mixture. As is evident from U.S. Pat. No. 4,141,934, there already is a large number of publications relating to processes aimed at mixing of styrene and maleic anhydride, without any of these describing a process by which polymers can be prepared without inhomogeneity.

On pages 4 and 5 of European OPI patent application No. 27274, it is stated that the process disclosed in U.S. Pat. No. 4,141,934 does not give the desired result, either, yielding heterogeneous reaction products.

The processes described cannot be used to effect complete polymerization in a one-tank reactor and attain the desired conversion of more than 80% while retaining product homogeneity. To achieve the desired result, a second reactor with metering equipment is used.

During copolymerization of aromatic monomers and unsaturated dicarboxylic anhydrides in mass or in the presence of a solvent, the viscosity of the reaction mixture to be polymerized rises to values that are higher as the degree of conversion is higher, making it even more difficult to obtain a homogeneous mixture.

The object of the invention is to obtain a process for the preparation of a thermoplastic polymer on the basis of an alkenyl aromatic monomer, an unsaturated dicarboxylic anhydride and, optionally, a rubber, that does not exhibit the above disadvantages.

SUMMARY OF THE INVENTION

The process according to the invention is characterized in that the monomer and/or solution thereof are/is reacted in at least two reaction zones that are in open connection with each other at the top and at the bottom, the reaction mixture being circulated through the reaction zones by means of a mixing device and/or conveying device.

It is preferred to use a vessel with a substantially cylindrical wall, provided with a coaxial guide tube, which is on both ends connected with the vessel, and rotating shaft, which are provided with one or more mixing devices, and a conveying device consisting of one or more screw ribbons, which are so fastened between the inner wall of the vessel and the outer wall of the guide tube as to allow of rotation.

Using the process according to the invention, a homogeneous product of constant composition is obtained.

The homogeneity of the product is determined from the width of the glass transition range (Tg range). Glass transition ranges of less than 9° C. are considered narrow transition ranges, indicating that the copolymer in question is of homogeneous composition. Less homogeneous copolymers have glass transition ranges of more than 9° C.

By application of the process according to the invention, therefore, a copolymer with a small dispersion in unsaturated dicarboxylic anhydride incorporation is obtained, leading to a narrow Tg range.

The process according to the invention does not impose any restrictions on the conversion in the tank reactor, so that the entire polymerization process can be carried out in one step.

As alkenyl aromatic monomers, in the process according to the invention use can be made of styrene, α-methylstyrene, paravinyl toluene and halogen-substituted styrenes.

Apart from maleic anhydride, as unsaturated dicarboxylic anhydrides in the process according to the invention use can be made of chloromaleic anhydride, dichloromaleic anhydride, citraconic anhydride, itaconic anhydride, phenylmaleic anhydride, aconitic anhydride, and mixtures of these.

As termonomer the styrene-maleic anhydride copolymer may contain 0–30 wt. % acrylonitrile, methacrylonitrile or an acrylate such as methylmethacrylate or ethylacrylate. Preferably, the terpolymer contains at least 5 wt. % acrylonitrile.

Suitable rubbers are ethylene-propylene copolymers, ethylenepropylene copolymers in which other polyunsaturated monomers have been copolymerized, polybutadiene, styrene-butadiene rubber, butadieneacrylonitrile rubber, polychloroprene, acrylate rubber, chlorinated polyethylene rubber, polyisoprene and cycloolefin rubbers.

Polymerization is preferably effected in mass or in the presence of a non-reactive solvent for the monomer, polymer and, optionally, the rubber. As solvent, methyl ethyl ketone is preferably chosen. Other solvents that may be chosen are acetone, toluene, xylene, dioxane, ethyl benzene or dimethylformamide. Polymerization can be effected in the presence of 1–80 wt. % solvent, by preference in the presence of 10–50 wt. % solvent.

Examples of the initiators that may be used are benzoyl peroxide, 2,4-dichlorobenzoyl peroxide, di-tert-butyl peroxide, tert-butyl peroxybenzoate, dicumyl peroxide, cumene hydroperoxide, diisopropylbenzene hydroperoxide, diisopropyl peroxydicarbonate, tert-butyl perisobutyrate, tert-butyl peroxyisopropylcarbonate, tert-butyl peroxypivalate, methyl ethyl ketone peroxide, stearoyl peroxide, tert-butyl hydroperoxide, lauroyl peroxide, azo-bis-isobutyronitrile or mixtures thereof.

The total amount of initiator required can be added simultaneously with the monomer feed. By using a mixture of these initiators with different activation temperatures or different half-life periods, or by supplying one and the same initiator, or different initiators, at several places, optimum conversion can be achieved and the product properties can be varied. The introduction of initiator at several places may promote good temperature control, especially when high-activity initiators are used.

Polymerization may also be effected at elevated temperature in the absence of an initiator.

As is customary in the polymerization of vinyl monomers, here, too, a chain length regulator can be added. Use can be made of the compounds customarily applied to this purpose. Examples are n-butyl mercaptane, tertiary amyl mercaptane, n-octyl mercaptane. Chain length regulators having a somewhat lower activity may also be used, for instance diethylene glycol, triethylene glycol, 2,2,4-trimethyl pentanediol, 1,5,diethylene glycol monobutylether and high-boiling aliphatic alcohols. These compounds in addition have a viscosity-reducing effect.

To the polymerization mixture the customary additives, such as stabilizers, antioxidants, lubricants, fillers, pigments, etc., may be added.

The polymerization temperature generally is between 50° and 200° C. A temperature between 80° and 150° C. is preferred.

The pressure in the reactor generally is between 2 and 100 bar, depending, inter alia, on mixer type, circulation rate, temperature and viscosity of the reaction mass. By preference the pressure is between 5 and 50 bar. If relatively volatile monomers or other additives are used, a pressure between 10 and 75 bar can be applied.

In the process according to the invention both the circulation time and the mixing time, which are both influenced by the speed of the screw ribbon and that of the mixing device, are of major importance.

The circulation time, defined as the time it takes a volume element to circulate through the entire reactor along a flow path, is between 0.1 and 30 seconds, preferably between 1 and 10 seconds.

The mixing time is between 0.1 and 300 seconds, preferably between 1 and 70 seconds.

The mixing time is defined as the time needed for equalization of the concentration of a fed substance to such an extent that the concentration at any place deviates by less than 5% from the calculated final value.

The mixing time preferably is 10 times the circulation time or shorter.

The copolymers prepared according to the invention have a weight average molecular weight of between 30,000 and 500,000, and preferably between 75,000 and 300,000.

The weight average molecular weight (Mw) can be determined via a method described in Journal of Applied Polymer Science, Vol. 20, 1619–1626 (1976). By determination of the intrinsic viscosity at 25.0° C. in tetrahydrofuran a method has been developed for determining, by a one-point determination, the weight-average molecular weight (Mw). For MA contents of 5–50 mole % and an Mw range of $2 \times 10^4$ to $7 \times 10^6$, the following holds:

$$[n] = 3.98 \cdot 10^{-4} \cdot Mw^{0.596}$$

where:

$[n]$ = intrinsic viscosity
$Mw$ = weight-average molecular weight.

The styrene maleic anhydride copolymers prepared according to the invention have a maleic anhydride content of between 15 and 35 wt. % and a styrene content of between 65 and 85 wt. %. By preference, a copolymer with a maleic anhydride content of between 20 and 30 wt. % and a styrene content of between 70 and 80 wt. % is prepared.

For further processing of the solution, it is useful to maximize conversion. After removal of the solvent, this yields a highly concentrated solution, the solids content of which corresponds with the conversion, which can be extruded without prior evaporation.

The equipment used in the invention has a conveying device consisting of one or more screw ribbons, which are so installed between the inner wall of the vessel and the outer wall of the guide tube that they can be made to rotate around the vessel axis. The degree to which a conveying device consisting of such a screw ribbon is affected by the viscosity of the medium is low, so that its efficiency as regards pumping action is better than that of other conveying devices and/or pumps. The flow through the guide tube that is created by the screw ribbon operating as pump can now bring about very rapid equalization of the concentration when use is made of rapidly rotating stirring devices, such as propellors, while the residence time of the medium in the vessel can be shortened very substantially.

If use is made of various propellors, placed at a distance from one another, the feeding device for each of the components to be mixed can now be installed before a stirring device, viewed in the direction of flow. Thus, various components can fully separately be mixed with the circulating medium by a stirring device.

According to Dutch Patent Specification No. 158393, such equipment would have the disadvantage that during polymerization the low-viscosity monomer that is continuously supplied through the connection for the main stream is not instantaneously mixed uniformly with the high-viscosity reaction mixture. As a result, the monomer forms a layer, separate from the reaction mixture near the reactor inlet, which is not constant but changes from time to time, and which at one moment occupies about 20% of the volume of the reaction vessel, while the next moment it has disappeared altogether. Such an unstable monomer layer renders it very difficult to control the temperature in the reaction mixture and gives rise to fluctuations in the quality of the polymers prepared.

BRIEF DESCRIPTION OF THE DRAWINGS

The invention will be elucidated on the basis of the embodiment represented in the drawings.

DESCRIPTION OF PREFERRED EMBODIMENTS

Figure 1:
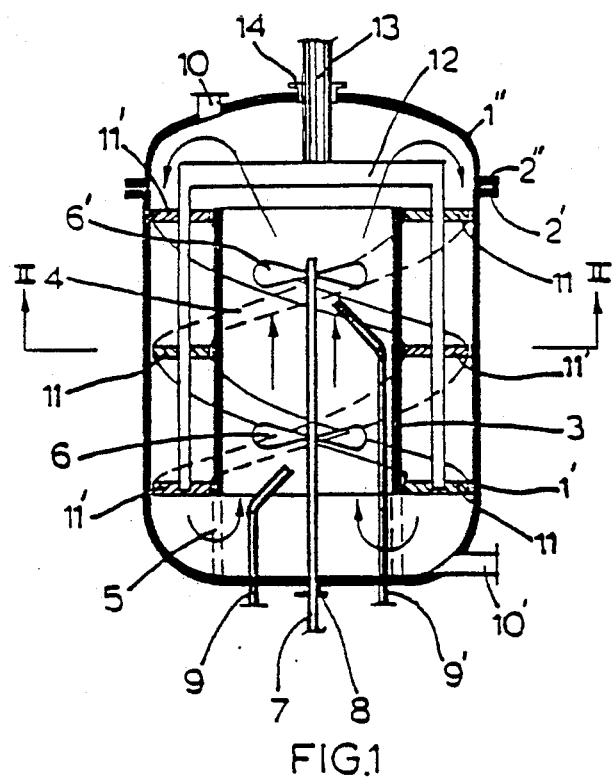
FIG. 1 shows a longitudinal section across a reactor vessel with mixing device.
Figure 2:
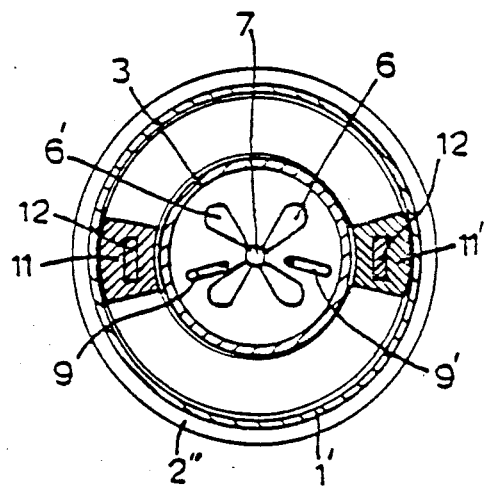
FIG. 2 a cross section of the same vessel, approximately halfway the length, according to line II—II.

A reactor vessel is made up of a substantially cylindrical shell, consisting of two detachable halfs 1' and 1", that are connected, for instance, by means of flanges 2' and 2". In the vessel there is a coaxial partition wall 3, which does not continue to the end faces of the vessel and which forms guide tube 4. For support purposes, the wall of this tube is one side attached rigidly to shell 1', and this side is provided with openings 5 that are large enough to admit a liquid flow without offering much resistance. Within guide tube 4, stirrers 6, 6', etc. are provided, for instance propellor mixers with two blades. Thus, the guide tube in fact forms a mixing chamber. The propellors are rigidly fastened to a rotating shaft 7, which is extended through a stuffing box 8 to outside the vessel, where this shaft can be driven. Each propellor brings about extremely good micromixing within a small distance from the mixing tube, provided speed and propellor are suitably chosen so that the product of revolutions per second times (diameter in meters)$^2$ is at least 0.05 m$^2$ per second. The components to be mixed can now be introduced separately into the reactor, for instance such that each component is separately mixed into the main stream before a propellor, seen in the direction of flow. The polymerization referred to can effectively be brought about in this vessel by using a feed tube for suitably distributing a second component and raw materials, dispersing agent, and the like between these two streams, or feeding these separately. To this end, feed tubes 9, 9', etc., are provided, which can be used to feed a component to propellor 6, 6', etc., respectively. The supply and discharge of the main stream can take place via connections 10 and 10'.

Between the wall of vessel section 1' and the wall of mixing tube 4, screw ribbons 11 and 11' are installed. These screw ribbons are attached to a fork 12, which can make the ribbons rotate around the vessel axis by means of rotating shaft 13, at the end of which fork 12 is rigidly attached. This shaft is also extended through a stuffing box, 14, to outside the vessel, where it can be driven. If use is made of two ribbons, the screw ribbon dimension are preferably such that, at a customary ribbon pitch of at most 0.75 times the vessel diameter, the blade width of a ribbon equals 0.2 times the vessel diameter, while the product of speed and circulation time is at most 20, both calculated over the same unit of time. It follows that there are no limitations on the actual vessel size if the advantages as described above are to be obtained, provided the above-mentioned conditions are satisfied. Through their pumping action, the screw ribbons effect rapid circulation of the liquid through the mixing chamber, as is indicated by arrows in the drawing.

For completeness' sake it is pointed out that such equipment is described in Dutch patent application laid open to public inspection No. 6516783.

Moulding compounds prepared according to the invention are suitable for many applications. A wide variety of objects can be prepared from them, such as tubes, bottles, furniture, car dashboards, cabinets and housings for electronic and domestic appliances, shoe heels, caravans, skis and surf boards.

The invention will be elucidated on the basis of the following examples and comparative experiments, without being restricted thereto.

EXAMPLE 1

A reactor as described with reference to the figure, with a reactor volume of 0.004 m$^3$, is continuously charged with a feed consisting of 42 wt. % styrene, 13 wt. % maleic anhydride (MA), 0.2 wt. % benzoyl peroxide (BPO) and 44.8 wt. % methyl ethyl ketone (MEK).

The reaction temperature is 110° C., the residence time 4 hours.

The propellor mixers in the guide tube have a speed of 2500 rpm, the ribbon mixer operates at 25 rpm. The solution leaving the reactor is collected in acetone and coagulated in methanol. The polymer is subsequently dried in a drying stove and then analyzed.

Under the stirring conditions in this test, the circulation time of the solution is 7 seconds and the mixing time 42 seconds. The results presented in Table 1 show that a homogeneous product is obtained, the glass transition range being 6° C.

EXAMPLE 2

In this example the ribbon mixer speed is 110 rpm, all other conditions being the same as in Example 1. The circulation time is 2.2 seconds and the mixing time 13 seconds. The copolymer obtained is of homgeneous composition.

COMPARATIVE EXAMPLE A

The propellor mixer is taken out of the reactor. The ribbon mixer speed is 100 rpm. All other conditions are as in Example 1.

The circulation time is 6.6 seconds and the mixing time is undefined, but more than 70 seconds.

A copolymer having a deterogeneous composition is obtained.

EXAMPLE 3

A reactor as described with reference to the figure, with a reactor volume of 0.004 m$^3$, is continuously charged with a feed consisting of 58.56 wt. % styrene, 10.30 wt. % MA, 31.00 wt. % MEK and 0.14 wt. % BPO.

The reaction temperaure is 110° C., the residence time 2 hours. The propellor mixer and the ribbon mixer operate at a speed of 2000 and 23 rpm, respectively.

The circulation time is 8.6 seconds, as is the mixing time.

The copolymer obtained has a homogeneous composition.

COMPARATIVE EXAMPLE B

This experiment was carried out in the same way as Example 3. The propellor mixer speed is 2000 rpm, the ribbon mixer speed 6 rpm.

The circulation time and the mixing time both are 34.0 seconds.

A copolymer of heterogeneous composition is obtained.

EXAMPLE 4

A reactor as described with reference to the figure, with a reactor volume of 0.004 m$^3$, is continuously charged with a feed consisting of 42.2 wt. % styrene, 14.8 wt. % maleic anhydride (MA), 42.8 wt. % methyl ethyl ketone (MEK) and 0.2 wt. % benzoyl peroxide (BPO). The reaction temperature is 130° C., the residence time 4 hours.

The propellor mixers in the guide tube operate at 2000 rpm, and the ribbon mixer at 100 rpm.

The circulation time is 3.0 seconds and the mixing time 18.0 seconds.

The polymer obtained is of homogeneous composition.

TABLE I

| Example | Circulation time (sec.) | Mixing time (sec.) | MA conversion (%) | Styrene conversion (%) | Overall-conversion (%) | MA in end product (%) | $\overline{Mw}$ | Tg-range (°C) | Δ Tg (°C) |
|---|---|---|---|---|---|---|---|---|---|
| 1 | 7.0 | 35 | 80.8 | 72.4 | 74.5 | 27.1 | 91000 | 164–170 | 6 |
| 2 | 2.2 | 13 | 85.1 | 72.3 | 75.4 | 27.1 | 103000 | 164–170 | 6 |
| A | 6.6 | — | 75.6 | 54.9 | 60.2 | 30.3 | 61000 | 171–183 | 12 |
| 3 | 8.6 | 8.6 | 80.9 | 54.7 | 58.8 | 20.7 | 177000 | 150–156 | 6 |
| B | 34.0 | 34.0 | 77.4 | 55.7 | 59.2 | 19.7 | 173000 | 148–159 | 11 |
| 4 | 3.0 | 18.0 | 82.5 | 79.4 | 80.2 | 26.6 | 83000 | 163–170 | 7 |

We claim:

1. A process for preparing a homogeneous thermoplastic polymer comprising:
   (a) introducing a reaction mixture composed of an alkenyl aromatic monomer, an unsaturated dicarboxylic anhydride monomer and, optionally, a rubber into a reaction vessel; and
   (b) polymerizing the reaction mixture, while sequentially and repeatedly conveying the mixture through a first reaction zone in the vessel and mixing the mixture in a second reaction zone in the vessel, wherein said reaction zones each have a top and a bottom, and wherein the respective tops of the reaction zones are confluent and the respective bottoms of the reaction zones are confluent, wherein said reaction vessel comprises:
   a circumferential outer wall member having a top and a bottom;
   a guide tube having a top, a bottom, an inner wall and an outer wall, disposed generally coaxially within the circumferential outer wall member, defining said first reaction zone between the outer wall member and the outer wall, and defining said second reaction zone within the inner wall;
   wherein the top and bottom of the guide tube are disposed within the top and bottom of the wall member so that the first and second reaction zones are confluent at the top and bottom of the guide tube;
   a rotating screw ribbon conveying device including one or more screw ribbons and disposed in the first reaction zone; and
   a rotating shaft mixing device disposed in said second reaction zone.

2. a process according to claim 1 wherein the polymerization is effected as a radial solution polymerization.

3. Process according to claim 1, characterized in that the alkenyl aromatic monomer is styrene and/or α-styrene and/or paravinyl toluene.

4. Process according to claim 1, characterized in that the unsaturated dicarboxylic anhydride is maleic anhydride.

5. Process according to claim 1, characterized in that the rubber is an polybutadiene, styrene-butadiene rubber, butadiene-acrylonitrile rubber, polychloropropene, acrylate rubber, chlorinated polyethylene rubber, polyisoprene or cycloolefin rubber.

6. Process according to claim 1, characterized in that the polymerization is effected in the presence of 1–80 wt. % of a non-reactive solvent for the monomer, polymer and, optionally, rubber.

7. Process according to claim 1, characterized in that bulk polymerization is applied.

8. Process according to claim 1, characterized in that the polymerization temperature is 50–200° C.

9. Process according to claim 1, characterized in that the circulation time is between 0.1 and 30 seconds.

10. Process according to claim 1, characterized in that the mixing time is between 0.1 and 300 seconds.

11. Process according to claim 1, characterized in that the solvent is methyl ethyl ketone.

12. Process according to claim 1, characterized in that a styrenemaleic anhydride copolymer with 15–35 wt. % maleic anhydride and 65–85 wt. % styrene is prepared.

13. Process according to claim 1, characterized in that a styrenemaleic anhydride copolymer with 20–30 wt. % maleic anhydride and 70–80 wt. % styrene is prepared.

14. Process according to claim 1, characterized in that a styrenemaleic anhydride copolymer with an Mw between 30,000 and 500,000 is prepared.

15. A process for preparing a homogeneous thermoplastic polymer comprising:
   (a) introducing a reaction mixture composed of an alkenyl aromatic monomer, an unsaturated dicarboxylic anhydride monomer and, optionally, a rubber into a reaction vessel; and
   (b) polymerizing the reaction mixture, while sequentially and repeatedly conveying the mixture through a first reaction zone by means of one or more screw ribbons and mixing the mixture in a second reaction zone in the vessel by means of a rotating shaft mixing device, wherein said reaction zones each have a top and a bottom, and wherein the respective tops of the reaction zones are confluent and the respective bottoms of the reaction zones are confluent, and wherein the polymerization is effected as a radical solution polymerization.

* * * * *